United States Patent
Kang

(10) Patent No.: US 8,679,220 B2
(45) Date of Patent: Mar. 25, 2014

(54) CERAMIC AND CERMET HAVING THE SECOND PHASE TO IMPROVE TOUGHNESS VIA PHASE SEPARATION FROM COMPLETE SOLID-SOLUTION PHASE AND THE METHOD FOR PREPARING THEM

(75) Inventor: Shin Hoo Kang, Seoul (KR)

(73) Assignee: SNU R&DB Foundation, Seoul (KR)

( * ) Notice: Subject to any disclaimer, the term of this patent is extended or adjusted under 35 U.S.C. 154(b) by 954 days.

(21) Appl. No.: 12/305,723

(22) PCT Filed: Jun. 20, 2007

(86) PCT No.: PCT/KR2007/002998
§ 371 (c)(1),
(2), (4) Date: Jun. 14, 2010

(87) PCT Pub. No.: WO2007/148921
PCT Pub. Date: Dec. 27, 2007

(65) Prior Publication Data
US 2010/0273637 A1    Oct. 28, 2010

(30) Foreign Application Priority Data

Jun. 21, 2006 (KR) .................. 10-2006-0055957

(51) Int. Cl.
*C22C 1/05* (2006.01)
*C22C 29/02* (2006.01)
*C22C 29/04* (2006.01)

(52) U.S. Cl.
USPC .................. 75/236; 75/238; 75/242; 419/31; 419/46; 264/603; 264/676; 501/87; 501/93; 501/96.1; 423/440

(58) Field of Classification Search
USPC ......... 75/236, 238, 242; 501/86, 93, 96.1, 87; 419/31, 46; 423/440; 264/603, 676
See application file for complete search history.

(56) References Cited

U.S. PATENT DOCUMENTS

| | | | |
|---|---|---|---|
| 4,008,090 A * | 2/1977 | Miyake et al. | 501/91 |
| 5,380,688 A * | 1/1995 | Dunmead et al. | 501/87 |
| 5,666,636 A | 9/1997 | Park et al. | |
| 5,756,410 A * | 5/1998 | Dunmead et al. | 501/96.1 |
| 6,007,598 A * | 12/1999 | Dunmead et al. | 75/236 |
| 7,651,967 B2 * | 1/2010 | Kang | 501/87 |
| 2005/0047950 A1 | 3/2005 | Shim | |

FOREIGN PATENT DOCUMENTS

| | | |
|---|---|---|
| JP | 10000502 A | 1/1998 |
| JP | 10242221 A | 9/1998 |

* cited by examiner

*Primary Examiner* — George Wyszomierski
*Assistant Examiner* — Ngoclan T Mai
(74) *Attorney, Agent, or Firm* — Sughrue Mion, PLLC

(57) ABSTRACT

This invention relates to a ceramic and a cermet each having a second phase for improving toughness via phase separation from a complete solid-solution phase and to a method of preparing them. The ceramic and the cermet may have the second phase phase-separated from the complete solid-solution phase, thereby easily achieving a great improvement in toughness and exhibiting other good properties including high strength, consequently enabling the manufacture of high-strength and high-toughness cutting tools, instead of conventional WC—Co hard materials.

29 Claims, 3 Drawing Sheets

CERAMIC AND CERMET HAVING THE SECOND PHASE TO IMPROVE TOUGHNESS VIA PHASE SEPARATION FROM COMPLETE SOLID-SOLUTION PHASE AND THE METHOD FOR PREPARING THEM

This is a national stage application under 35 U.S.C. §371 of National Stage 371 of PCT/KR2007/002998 filed on Jun. 20, 2007, which claims priority from Korean patent application 10-2006-0055957 filed on Jun. 21, 2006, all of which are incorporated herein by reference.

TECHNICAL FIELD

The present invention relates to a ceramic and a cermet each having a second phase for improving toughness via phase separation from a complete solid-solution phase and a method of preparing them, and particularly, to a ceramic and a cermet each having a second phase for improving toughness via phase separation from a complete solid-solution phase, in which the ceramic and the cermet are suitable for use as high-speed cutting tool materials and die materials in the fields of the machine industry, including the manufacture of machines, the automobile manufacturing industry, etc., and in which the mechanical properties thereof are superior overall, and in particular, the toughness thereof is very good, and to a method of preparing them.

BACKGROUND ART

For cutting tools or wear-resistant tools mainly used in the metal cutting process, required by machine industries, useful are WC based hard alloys, various TiC or Ti(CN) based cermet alloys, other ceramics, or high-speed steels.

Among these, a cermet is a sintered body of ceramic-metal composite powder containing, for example, (Ti,W)C, (Ti,W)(CN), TiC, or Ti(CN) and a binder metal, such as Ni, Co, or Fe, as main components, and, as an additive, carbide, nitride, or carbonitride of Group IVa, Va, and VIa metals in the periodic table.

As mentioned above, a cermet is prepared by mixing TiC, Ti(CN), or WC with hard ceramic powder, including $Mo_2C$, NbC, or TaC, and metal powder of Co, Ni, Fe, in a matrix phase, for binding the ceramic powder, and sintering the mixture in a vacuum or in a nitrogen atmosphere.

TiC has very high Vicker's hardness of 3,200 $kg/mm^2$, a considerably high melting point of 3,423 to 3,523 K, and relatively high oxidation resistance until 973 K, and furthermore, has superior properties, including wear resistance, corrosion resistance, electromagnetic radiation properties, and light-collecting properties. Thus, TiC has been mainly used as a high-speed cutting tool material, instead of conventional WC—Co alloys.

In the case where a cermet is prepared using TiC, a binder metal such as Ni is used as a liquid metal upon sintering. In this case, however, a wetting angle becomes greater than WC—Co combinations, undesirably causing rapid grain growth of TiC, leading to decreased toughness.

Nevertheless, a TiC—$Mo_2C$—Ni cermet was first mass-produced by Ford Motor Company, USA, in 1956. Although this cermet was not greatly improved in toughness, it was used in semi-finishing and finishing as high-hardness tool material for precise machining operations.

In the 1960s and 1970s, in order to improve toughness, which is the great disadvantage of the TiC—Ni cermet system, attempts to add various elements to the above TiC—Ni cermet system were made, but did not attain outstanding results.

On the way, in the 1970s, Ti(CN), which is a more stable thermodynamic phase, was realized through the addition of TiC with TiN. Further, because Ti(CN) has a finer structure than TiC, toughness may be improved to some degree, and as well, chemical stability and mechanical impact resistance may be increased.

With the goal of improving toughness, many additive carbides such as WC, $Mo_2C$, TaC, NbC, etc., have been used, and Ti(CN)-M1C-M2C— . . . —Ni/Co type products are commercially available to date.

In the case where carbide is added to improve toughness, a general microstructure of a sintered TiC or Ti(CN) based cermet is observed as a core/rim structure, in which the hard phase of the core/rim structure is enclosed with a binder phase such as Ni or Co.

In the core/rim structure, the core is undissolved TiC or Ti(CN) in the liquefied metal binder (Ni, Co) during sintering, the structure of which has high hardness.

The rim around the core is a solid-solution (which is represented by (Ti, M1, M2 . . . )(CN)) between the core component, TiC or Ti(CN), and the additive carbide, and is a structure having high toughness, rather than high hardness.

In this way, the cermet is advantageous because toughness problems, which are drawbacks of TiC—Ni or Ti(CN)—Ni based simple cermet, are alleviated, thanks to the formation of the rim structure.

However, even if such toughness problems are alleviated, the cermet having the core/rim structure still has a problem in that the toughness is inferior to WC—Co based hard alloys, and thus has not yet completely substituted for WC—Co.

Therefore, lots of effort to develop a cermet having improved toughness through the formation of a complete solid-solution phase having no core/rim structure have been continuously made by tool manufacturers, such as Sumitomo, Mitsubishi, etc.

However, because the amount of the solid-solution phase which is formed during the sintering of composite powder is dependent on the sintering temperature and time, it is impossible to actually obtain a cermet composed exclusively of a complete solid-solution using conventional carbonitride mixture powder or preparation methods thereof.

Therefore, the present inventors have developed solid-solution powder and cermet for substantially achieving a complete solution-solution phase <Korean Unexamined Patent Publication No. 2005-0081553>, and the toughness may be greatly improved according thereto.

However, a cermet that is able to greatly improve toughness even in the case where the complete solid-solution phase is formed as above or a partial solid-solution phase is additionally formed in addition to the complete solid-solution phase and that also has other good properties including high strength, along with a preparation method thereof, has not yet been developed.

DISCLOSURE

Technical Problem

Accordingly, the present invention has been made keeping in mind the above problems occurring in the related art, and an aspect of the present invention is to provide a ceramic and a cermet each having a second phase for improving toughness via phase separation from a complete solid-solution phase, in which the ceramic and the cermet may have a second phase phase-separated from the complete solid-solution phase, thereby making it easy to greatly improve toughness and exhibiting other good properties including high strength, consequently enabling the manufacture of high-strength and high-toughness cutting tools, instead of conventional WC—Co hard materials, and to provide a method of preparing the ceramic and the cermet.

Technical Solution

The above aspect of the present invention is achieved using a ceramic, including a sintered body of solid-solution powder including composite solid-solution carbide, composite solid-solution carbonitride or a mixture thereof, of two or more metals selected, including titanium and a Group VIa metal, from among Group IVa, Va, and VIa metals in the periodic table, wherein a complete solid-solution phase and a second phase for improving toughness phase-separated from the complete solid-solution phase are present in the microstructure of the sintered body.

The amount of carbide, carbonitride or mixture thereof of the selected Group VIa metal may be 30~50 mole % based on the total amount of the composite carbide, composite carbonitride or mixture thereof.

The selected Group VIa metal may be W or Mo.

In the case where a metal, other than the titanium and Group VIa metal, is selected, the amount of carbide, carbonitride or mixture thereof of the metal may be 0.1~20 mole % based on the total amount of the composite carbide, composite carbonitride or mixture thereof.

In the microstructure of the sintered body, a partial solid-solution phase, which is additionally mixed in the complete solid-solution phase, may be further present, in addition to the complete solid-solution phase and the second phase for improving toughness phase-separated from the complete solid-solution phase. In the present invention, the term "partial solid-solution phase" means a phase responsible for strengthening toughness and hardness of the cermet by considerably increasing the rim portion in a conventional microstructure composed of a core and a rim resulting from sintering of a mixture of carbide such as TiC, TaC, WC or carbonitride and complete solid-solution powder.

The above aspect of the present invention is achieved using a cermet, including a sintered body including composite solid-solution carbide, composite solid-solution carbonitride or a mixture thereof, of two or more metals selected, including titanium and a Group VIa metal, from among Group IVa, Va, and VIa metals in the periodic table, and at least one metal selected from the group consisting of nickel, cobalt, and iron, wherein a complete solid-solution phase and a second phase for improving toughness phase-separated from the complete solid-solution phase are present in the microstructure of the sintered body.

The amount of carbide, carbonitride or mixture thereof of the selected Group VIa metal may be 30~50 mole % based on the total amount of the composite carbide, composite carbonitride or mixture thereof.

The selected Group VIa metal may be W or Mo.

In the case where a metal, other than the titanium and Group VIa metal, is selected, the amount of carbide, carbonitride or mixture thereof of the metal may be 0.1~20 mole % based on the total amount of the composite carbide, composite carbonitride or mixture thereof.

In the microstructure of the sintered body, a partial solid-solution phase which is additionally mixed in the complete solid-solution phase may be further present, in addition to the complete solid-solution phase and the second phase for improving toughness phase-separated from the complete solid-solution phase.

The above aspect of the present invention is achieved by a method of preparing a ceramic, including providing complete solid-solution phase powder including composite solid-solution carbide, composite solid-solution carbonitride or a mixture thereof, of two or more metals selected, including titanium and a Group VIa metal, from among Group IVa, Va, and VIa metals in the periodic table, and sintering the provided powder, wherein a second phase for improving toughness is obtained via phase separation from the complete solid-solution phase powder through sintering.

The providing the complete solid-solution phase powder may include mixing or mixing and grinding oxide of the two or more metals and carbon powder and subjecting the powder to reducing and carburizing or to reducing, carburizing, and nitriding.

The amount of carbide, carbonitride or mixture thereof of the selected Group VIa metal may be 30~50 mole % based on the total amount of the composite carbide, composite carbonitride or mixture thereof.

The selected Group VIa metal may be W or Mo.

In the case where a metal other than the titanium and Group VIa metal is selected, the amount of carbide, carbonitride or mixture thereof of the metal may be 0.1~20 mole % based on the total amount of the composite carbide, composite carbonitride or mixture thereof.

The method of preparing the ceramic may further include mixing the powder with hard phase TiC or Ti(CN) powder before sintering.

The sintering the powder may be conducted in a nitrogen or nitrogen-containing mixture gas atmosphere.

The sintering may be conducted through heating in a furnace in a nitrogen or nitrogen-containing mixture gas atmosphere at a pressure of 0.1~100 torr.

The sintering may be conducted through heating at a heating rate of 1~30 K per min and then sintering at 1600~1900 K.

Upon the sintering or after the sintering, hot pressing, hot isostatic pressing (HIP), or GPS may be applied.

The shape and the size of the second phase may be changed by adjusting the type of the binder, the amount of the binder, the amount of carbide, carbonitride or mixture thereof of the selected Group VIa metal, the amount of injected nitrogen, the nitrogen-injecting time, the sintering time, the heating rate, or the sintering temperature.

The above aspect of the present invention is achieved through a method of preparing a cermet, including mixing or mixing and grinding at least one metal selected from the group consisting of nickel, cobalt, and iron, oxide of two or more metals selected, including titanium and a Group VIa metal, from among Group IVa, Va, and VIa metals in the periodic table, and carbon powder at a predetermined composition ratio, thus providing nano-sized crystallite powder (S1-2); subjecting the powder to reducing and carburizing or to reducing, carburizing, and nitriding (S2); and sintering the prepared powder (S3), wherein a second phase for improving toughness is obtained via phase separation from the complete solid-solution phase powder upon sintering.

The amount of carbide, carbonitride or mixture thereof of the selected Group VIa metal may be 30~50 mol % based on the total amount of the composite carbide, composite carbonitride or mixture thereof.

The selected Group VIa metal may be W or Mo.

In the case where a metal other than the titanium and Group VIa metal is selected, the amount of carbide, carbonitride or mixture thereof of the metal may be 0.1~20 mole % based on the total amount of the composite carbide, composite carbonitride or mixture thereof.

The method of preparing the cermet may further include, before the sintering, mixing the powder with hard phase TiC or Ti(CN) powder (S4).

The sintering the powder may be conducted in a nitrogen or nitrogen-containing mixture gas atmosphere.

The sintering may be conducted through heating in a furnace in a nitrogen or nitrogen-containing mixture gas atmosphere at a pressure of 0.1~100 torr.

The sintering may be conducted through heating at a heating rate of 1~30 K per min and then sintering at 1600~1900 K.

Upon sintering or after sintering, hot pressing, hot isostatic pressing (HIP), or GPS may be applied.

The shape and the size of the second phase may be changed by adjusting the type of the binder, the amount of the binder, the amount of carbide, carbonitride or mixture thereof of the selected Group VIa metal, the amount of injected nitrogen, the nitrogen-injecting time, the sintering time, the heating rate, or the sintering temperature.

Hereinafter, a description will be given of a ceramic and a cermet each having the second phase for improving toughness via phase separation from a complete solid-solution phase and a method of preparing them, according to the present invention.

In the present invention, in the case where a ceramic or a cermet is sintered from solid-solution powder or cermet powder while toughness is increased due to the presence of a complete solid-solution phase having no core/rim structure, the second phase, such as a whisker phase, is allowed to be present in the microstructure of the sintered body via phase separation from the complete solid-solution phase to thus facilitate a further improvement in toughness.

Further, the present invention is intended to improve toughness by forming the second phase from the complete solid-solution phase through separation even in the case where the complete solid-solution phase is additionally mixed with a partial solid-solution phase.

According to the present invention, solid-solution powder having a complete solid-solution phase for kthe preparation of a ceramic, or cermet powder including the solid-solution powder and a binder metal is prepared. When such powder is prepared, carbide, carbonitride or a mixture thereof of a Group VIa metal in the periodic table, having thermodynamic incompatibility with nitrogen, (e.g., WC, MoC, $Mo_2C$, $Cr_2C_3$, VC), should be included along with titanium.

The amount of carbide, carbonitride or mixture thereof of a Group VIa metal in the periodic table, including tungsten carbide (WC), may be set to 30~50 mole %, from the point of view of easily forming the second phase as seen below. In particular, in the case where the amount exceeds 50 mole % and is 55 mole % or more, it is difficult to control the microstructure attributable to the formation of a coarse second phase.

To form the complete solid-solution phase, oxide having a nano size or a micron size of two or more metals, selected, including titanium and a Group VIa metal, from among Group IVa, VA, and VIa metals in the periodic table is mixed with carbon powder, and the mixture is ground, finally providing nanocrystallite powder (i.e., a process of adjusting the crystallite size to a nano size is conducted) (S1-1).

To this end, the mixture of oxide and carbon powder (in the case of a cermet, metal powder or oxide thereof, as mentioned below) is ground to yield nano-sized crystallites using high-energy ball milling. In the grinding process, powder having nano-sized crystallites may be easily provided even through only ball milling. Alternatively, in the case where nano-sized oxide (in the case of a cermet, nano-sized metal powder or oxide thereof, as mentioned below) is used from the beginning, the mixture thereof with carbon powder may be used without grinding, but may be further ground, if required.

The mixing ratio may be appropriately determined depending on the predetermined composition of the powder. For instance, all of the metals that are solutes in the solid-solution powder according to the present invention may be formed into a complete solid-solution phase within a range of solid solubility thereof.

In the case of cermet powder, a binder metal having a nano size or a micron size or oxide thereof is mixed together, and grinding is conducted depending on need, thus obtaining nano-sized crystallite powder.

Subsequently, the powder thus obtained is reduced and carburized, or reduced, carburized, and nitrided, that is, the carburizing is conducted, nitrogen is injected into a vacuum furnace, and reduced and carburized powder is nitrided in a nitrogen atmosphere, thereby forming carbide, carbonitride or mixture thereof.

Upon the reducing and carburizing or upon the reducing, carburizing, and nitriding, thermal treatment is preferably conducted at 1273 to 1773 K (1000 to 1500° C.), and more preferably 1273 to 1573 K (1000 to 1300° C.) for 3 hours or less in a vacuum or in a hydrogen atmosphere, ultimately generating economic benefits and maximizing the formation of a complete solid-solution phase.

In the prepared carbonitride nanopowder, the amount of oxygen is regarded as very important. Typically, when the amount of oxygen is increased, it is easy to form pores, and thus it is necessary to assure a minimum amount of oxygen and appropriate amounts of carbon and nitrogen in conformity therewith.

Under the above treatment conditions, the amount of nitrogen may be determined depending on the process temperature, partial pressure of nitrogen upon the synthesis of powder, and the amount of carbon added to the powder, and as a stable composition, C/N (molar ratio) may be 3/7, 5/5, and 7/3. On the other hand, as mentioned below, in the case of carbonitride, the separation of the second phase may be more easily realized upon sintering.

In this way, after the solid-solution powder or cermet powder having the complete solid-solution phase having a crystallite size adjusted to the nano scale while containing carbide, carbonitride or a mixture thereof of a periodic table Group VIa metal, which is thermodynamically incompatible with nitrogen, is obtained, it is subjected to phase separation at the same time of conducting sintering through vacuum sintering or atmosphere sintering, thereby attaining the second phase, such as a whisker phase, along with the complete solid-solution phase, in the microstructure of the sintered body.

The whisker phase may have various shapes, including an angular shape or a circular shape due to changes in surface energy when a liquid phase, that is, a binder phase, is increased.

Such second phases are uniformly distributed in the microstructure of the ceramic or cermet, greatly improving toughness.

In the present invention, the sintering is conducted not under general vacuum sintering conditions but under conditions including a nitrogen atmosphere, that is; nitrogen or nitrogen-containing mixture gas and a high temperature, thereby facilitating the deposition of carbide, carbonitride or a mixture thereof of a Group VIa metal in the periodic table, such as tungsten carbide (WC) or molybdenum carbide ($Mo_2C$), into the second phase, including a whisker phase or an angular or circular phase modified therefrom during the sintering. That is, the formation of the second phase may be very easily realized using the nitrogen atmosphere upon the sintering.

Specifically, the sintering is conducted through heating in a furnace in an atmosphere composed of nitrogen or nitrogen-containing mixture gas at a pressure of 0.1~100 torr. The heating is performed at a heating rate of 1~30 K per min to reach the sintering temperature. It is preferred that the sintering temperature be maintained at 1600~1900 K.

When the temperature is lower than 1600 K, it is difficult to achieve sufficient densification. On the other hand, when the temperature is higher than 1900 K, densification is difficult to realize, and the excessively high temperature negates economic benefits. The sintering is conducted for about 1 hour.

For example, a sintering procedure is conducted by heating from 1473 K, sintering at 1783 K for about 1 hour, and then cooling to 1473 K. As such, the heating rate is set to 2.7 K/min. During the heating, sintering, and cooling, nitrogen is injected to 5 torr or 40 torr. When relatively less nitrogen is injected, for example 5 torr, the heating range may become relatively decreased, for example heating from 1623 K to 1783 K.

During or after sintering, hot pressing, hot isostatic pressing (HIP), or GPS may be conducted, and these processes may be additionally applied after sintering. Hot pressing may be conducted at 1100~1400° C. for a relatively short time period of 5~60 min in a vacuum, $N_2$ or Ar atmosphere. The pressure may be appropriately applied in the range of 10~50 MPa. Further, HIP may be conducted at 1000~1400° C. lower than hot pressing for 5~60 min in an $N_2$ or Ar atmosphere. As such, the pressure may be applied in the range of 10~150 MPa.

According to the process of the present invention, a uniform microstructure composed not of a core/rim structure but of a complete solid-solution phase may be realized, and the second phase may be directly obtained from the complete solid-solution phase. Thus, without the additional mixing of carbide, such as WC or $Mo_2C$, a ceramic or a cermet containing the second phase, such as a fine whisker phase, may be provided.

Further, according to the present invention, the solid-solution powder or cermet powder may be additionally mixed with hard carbide or carbonitride, such as TiC or Ti(CN), before the sintering, so that a partial solid-solution phase including a hard phase may be further present, in addition to the already-present complete solid-solution phase.

The solid-solution powder or cermet powder including the complete solid-solution phase and further including the partial solid-solution phase is sintered. In this case, when the second phase is separated from the already-present complete solid-solution phase, toughness may be improved even in the coexistence of the complete solid-solution phase and the partial solid-solution phase.

Thereby, in the microstructure including the complete solid-solution phase or partial solid-solution phase and the whisker, for example, a whisker having a length of 5 μm or more and an aspect ratio of 1:10 or more may be provided. The size of the whisker may be variously regulated, that is, the amount of carbide, carbonitride or mixture of a Group VIa metal in the periodic table, the nitrogen injecting conditions, including the amount of nitrogen injected and the nitrogen-injecting time, and the sintering conditions, including the sintering time, the heating rate, and the sintering temperature, may be adjusted, such that the size of the whisker may be regulated, and the whisker may be prepared to have either a submicron size (more than 100 nm, less than 1 μm) or a micron size (ones of μm).

Further, in the microstructure including the complete solid-solution phase or partial solid-solution phase according to the present invention, the second phase may be formed to have various shapes, including circular shapes, in addition to the whisker shape. That is, the amount of the binder, such as Ni, Co, or Fe, the amount of carbide, carbonitride or mixture thereof of a Group VIa metal in the periodic table, the nitrogen injecting conditions, including the amount of nitrogen injected and the nitrogen-injecting time, and the sintering conditions, including the sintering time, the heating rate, and the sintering temperature, may be adjusted, and thereby the shape of the second phase may be regulated, and the second phase may be prepared to have either a submicron size (more than 100 nm, less than 1 μm) or a micron size (ones of μm).

Advantageous Effects

According to the present invention, a ceramic or a cermet may have the second phase formed via phase separation from a complete solid-solution phase, thereby making it easy to greatly improve toughness and realizing other good properties, including high strength, and thus may substitute for WC—Co hard materials, consequently enabling the manufacture of high-strength and high-toughness cutting tools.

BEST MODE

Hereinafter, a detailed description of the present invention is given through the following examples, which are set forth to illustrate, but are not to be construed as the limit of the present invention. The following examples are intended to complete the disclosure of the present invention and to easily embody the present invention by those skilled in the art, and furthermore may be variously modified within the accompanying claims.

Preparation of Solid-Solution Powder and Cermet Powder

First, desired compositions for solid-solution powder and cermet powder were determined, and $TiO_2$ and $WO_3$ oxides, as a 50 nm sized agglomerate, were prepared in respective amounts suitable therefor. The desired composition for solid-solution powder or cermet powder is as follows.

(i) $(Ti_{0.8}W_{0.2})C$ (Ti:W mole %=80:20) solid-solution powder composition;

(ii) $(Ti_{0.7}W_{0.3})C$ (Ti:W mole %=70:30) solid-solution powder composition;

(iii) $(Ti_{0.6}W_{0.4})C$ (Ti:W mole %=60:40) solid-solution powder composition;

(iv) $(Ti_{0.5}W_{0.5})C$ (Ti:W mole %=50:50) solid-solution powder composition;

(v) $(Ti_{1-x}W_x)C$-Me type cermet powder composition, in which said (i)~(iv) is mixed with 20 wt % of binder Ni or with 2.5~5.0 wt % of various binders (Co, Fe, FeCoNi).

For all of the above compositions, desired compositions for carbonitride were determined and prepared.

As results of analysis of components, the ceramic composition of said (i)~(iv) was (Ti,W)C-Me or (Ti,W)(CN)-Me containing Ni, Co, Cr, Fe, or mixtures thereof, represented by Me, as metals introduced into a jar and a ball for milling, in which the amount of Me was found to be about 3.5~5.0 wt % through SEM, TEM, and EDS after sintering.

The above prepared oxide was mixed with carbon powder, and the mixture was ground, and then the ground powder was thermally treated at 1473 K for 1 hour in a vacuum to thus be subjected to reducing and carburizing, or to reducing, carburizing, and nitriding.

Figure 1:
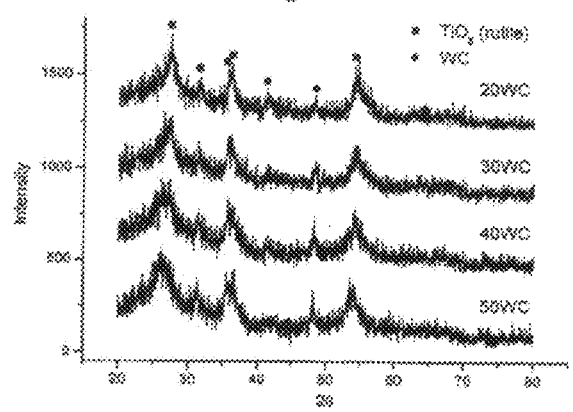
FIG. 1 illustrates the results of analysis of XRD of $TiO_2$, $WO_3$, and C material powders after mixing and grinding.

FIG. 1 illustrates the results of analysis of XRD of (Ti,W)C solid-solution powder [carbide having compositions of (i)~(iv)] prepared in an embodiment of the present invention.

Figure 2:
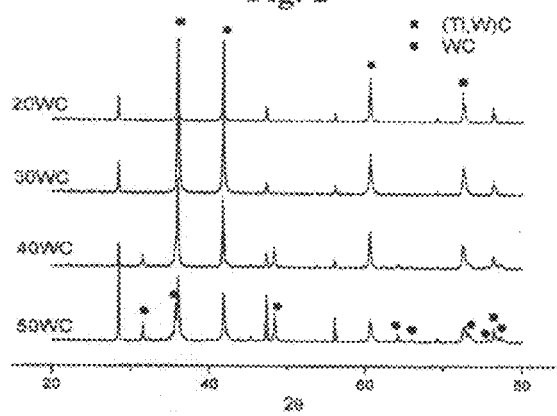
FIG. 2 illustrates the results of analysis of XRD representing the preparation of complete solid-solution powders having various $(Ti_{1-x}W_x)C$ compositions from the mixture powder through reducing and carburizing of $TiO_2$, $WO_3$, and C.

FIG. 1 shows that $TiO_2$, $WO_3$, and C having a micron size were mixed and ground to thus form amorphous or nanocrystallite oxide, and FIG. 2 shows that complete solid-solution powders having various $(Ti_{1-x}W_x)C$ compositions were prepared from the mixture of $TiO_2$, $WO_3$, and C. Here, the peak of the mixture of Ni, Co, Cr, and Fe, introduced during the milling, were not shown due to the small amount (<5 wt %) thereof.

As illustrated in FIG. 2, the formed solid-solution phase was monolithic, that is, a complete solid-solution phase. Further, in FIG. 2, in the case of $(Ti_{0.5}W_{0.5})C$, WC was seen to be present in a form mixed with the monolithic solid-solution phase. This was considered to be due to an excess of WC, that was not a solute in the target composition of $(Ti_{0.5}W_{0.5})C$.

For reference, as mentioned above, all metals that are solutes in the solid-solution powder may be formed into a complete solid-solution phase within a range of solid solubility thereof. For example, if WC is a solute therein, the solute amount thereof may be 15 wt % (4.5 mole %), 30 wt % (9.7 mole %), 60 wt % (27.3 mole %), and 80 wt % (50 mole %). In addition, in the case of $Mo_2C$ and NbC carbides and the like, they may be formed into a complete solid-solution phase within a range of solid solubility thereof (<10 mole %).

Sintering

The powder prepared through the above preparation process was sintered [1783 K (1510° C.), 1 hour] in a vacuum of $10^{-2}$ Torr. In addition, the powder thus prepared was sintered in a nitrogen atmosphere at a pressure of 5~40 torr, in which nitrogen was injected in the entire temperature range from the heating temperature [1473 K (1200° C.)], through the sintering temperature [1783 K (1510° C.), 1 hour], to the cooling temperature [1473 K (1200° C.)], or alternatively, the sintering was conducted at a different heating temperature [1623 K (1350° C.)] or by introducing nitrogen only in part of the temperature range. A description thereof will be given below.

Figure 3:
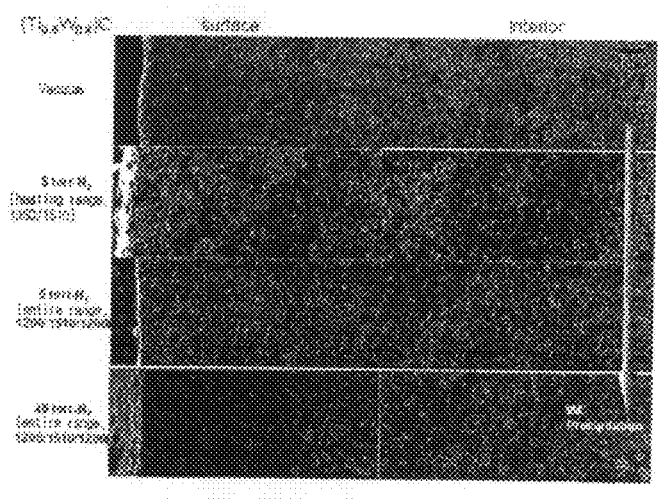
FIG. 3 is photographs illustrating the microstructures of the ceramic obtained after the $(Ti_{0.6}W_{0.4})C$ complete solid-solution powder is sintered in a vacuum or in different nitrogen atmospheres.
Figure 4:
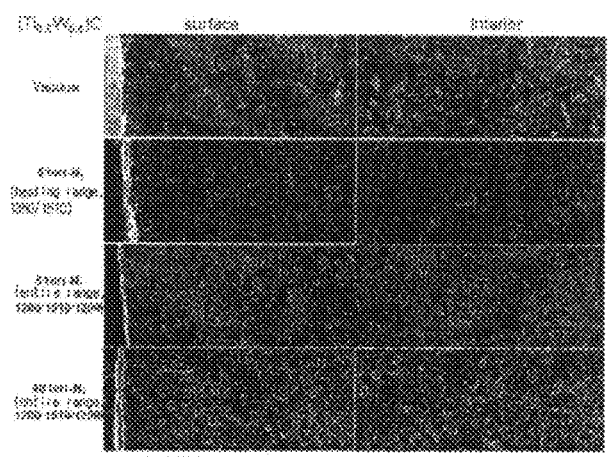
FIG. 4 is photographs illustrating the microstructures of the ceramic obtained after the $(Ti_{0.5}W_{0.5})C$ complete solid-solution powder is sintered in a vacuum or in different nitrogen atmospheres.
Figure 5:
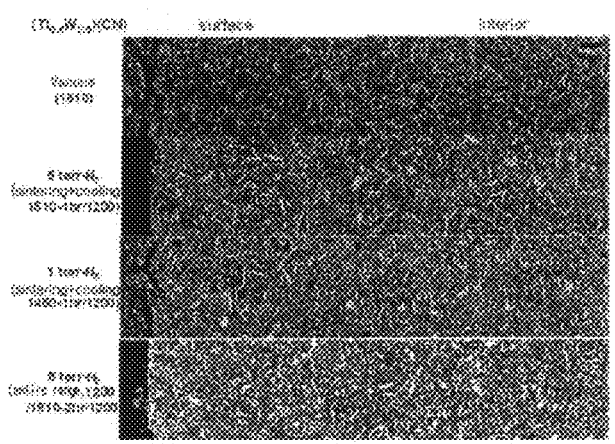
FIG. 5 is photographs illustrating the microstructures of the ceramic obtained after the $(Ti_{0.5}W_{0.5})CN$ complete solid-solution powder is sintered in a vacuum or in different nitrogen atmospheres.

FIGS. 3 to 5 are photographs illustrating the microstructures of the sintered ceramic samples.

FIG. 3 illustrates the microstructures of the surface and interior of the sintered body obtained by subjecting the (iii) composition $(Ti_{0.6}W_{0.4})C$ (Ti:W mole %=60:40) [more specifically, $(Ti_{0.6}W_{0.4})C$-5 wt % Me] to sintering in a vacuum or in a nitrogen atmosphere at a pressure of 5 torr or 40 torr, in which nitrogen is injected only in the range from the heating temperature [1623 K (1350° C.)] to the sintering temperature [1783 K (1510° C.), 1 hour], or alternatively nitrogen is injected in the entire temperature range from the heating temperature [1473 K (1200° C.)], through the sintering temperature [1783 K (1510° C.), 1 hour], to the cooling temperature [1473 K (1200° C.)].

FIG. 4 illustrates the microstructures of the surface and interior of the sintered body obtained by subjecting the (iv) composition $(Ti_{0.5}W_{0.5})C$ (Ti:W mole %=50:50) to sintering in a vacuum or in a nitrogen atmosphere at a pressure of 5 torr or 40 torr, in which nitrogen is injected only in the range from the heating temperature [1623 K (1350° C.)] to the sintering temperature [1783 K (1510° C.), 1 hour], or alternatively nitrogen is injected in the entire temperature range from the heating temperature [1473 K (1200° C.)], through the sintering temperature [1783 K (1510° C.), 1 hour], to the cooling temperature [1473 K (1200° C.)].

FIG. 5 illustrates the cases where carbonitride $(Ti_{0.5}W_{0.5})(CN)$ is subjected to sintering at 1783 K (1510° C.) for 1 hour in a vacuum, where sintering is conducted by injecting nitrogen at 5 torr or 1 torr during the sintering [1783 K (1510° C.), 1 hour and 1723 K (1450° C.), 1 hour] and cooling, and where sintering is conducted by injecting nitrogen in the entire temperature range from the heating temperature [1473 K (1200° C.)], through the sintering temperature [1783 K (1510° C.), 1 hour], to the cooling temperature [1473 K (1200° C.)].

As illustrated in FIGS. 3 to 5, the (Ti,W)C or (Ti,W)(CN) solid-solution powder could be seen to have a complete solid-solution phase structure without a core/rim structure, and also to have a microstructure in which the second phase, such as whiskers having a size of 10 μm, was uniformly distributed along with the complete solid-solution phase on the surface or interior thereof.

Further, as illustrated in FIGS. 3 to 5, when the solid-solution powder was sintered, nitrogen was applied, such as the injection of nitrogen or the formation of carbonitride, thus preparing whiskers having various aspect ratios and adjusting the amount of whiskers.

In particular, as the pressure of nitrogen was higher and the amount of W in (Ti,W)C or (Ti,W)(CN) was greater, the amount of whiskers was increased.

As illustrated in FIG. 5, in the case of using the $(Ti_{0.5}W_{0.5})(CN)$ solid-solution powder, more WC in a whisker form was separated and deposited even during the vacuum sintering. In the case where the sintering was conducted while injecting nitrogen, much more WC in a whisker form was separated and deposited. Further, depending on the sintering temperature [1783 K (1510° C.) and 1723 K (1450° C.)], the porosity of the sintered body varied but the shape and amount of the deposited WC second phase were not greatly changed. In the case where the sintering was conducted for 2 hours while nitrogen was injected in the entire temperature range, the WC second phase having various aspect ratios and irregular whisker shapes could be formed.

Table 1 below shows the properties of respective ceramics, in particular, toughness and hardness, in which the value of the properties is an average value of five measurements.

TABLE 1

| Material | Hv20 (GPa) | KIC (MPa·$m^{1/2}$) |
|---|---|---|
| Ceramic ($Ti_{0.7}W_{0.3}$)C (Sintering in Vacuum) | 19.2 ± 0.1 | 6.4 ± 0.2 |
| Ceramic ($Ti_{0.6}W_{0.4}$)C (Sintering in Vacuum) | 20.5 ± 0.3 | 7.7 ± 0.2 |
| Ceramic ($Ti_{0.5}W_{0.5}$)C (Sintering in Vacuum) | 18.9 ± 0.2 | 7.2 ± 0.2 |
| Ceramic ($Ti_{0.5}W_{0.5}$)C (Sintering in Nitrogen) | 19.1 ± 0.5 | 9.0 ± 1.0 |

TABLE 2

| Material | Hv20 (GPa) | KIC (MPa·$m^{1/2}$) |
|---|---|---|
| $Al_2O_3$ | 19.0~20.6 | 2.5~3.3 |
| $Si_3N_4$ | 14.2 ± 1.0 | 6.6 ± 0.5 |
| $Al_2O_3$/TiC | 19.1~20.5 | 4.5~4.9 |
| $Al_2O_3$/Ti(C,N) | 18.9~21.0 | 4.5~4.0 |
| $Al_2O_3$/$ZrO_2$ | 17.0 | 4.5 |
| SiC/$B_4$C | 30.2 ± 2.4 | 4.2 ± 0.1 |
| $Si_3N_4$/$TiB_2$ | 17.4 | 4.9 |

As is apparent from Tables 1 and 2, the hardness ($H_v$) and toughness ($K_{IC}$) of ceramics are measured using a Vicker's hardness meter under a load of 20 kg. The other materials are measured under a load of 10~30 kg.

As is apparent from Table 1, when the ceramic contains the second phase, both hardness and toughness can be improved. In particular, in the case where the sintering is conducted in a nitrogen atmosphere, toughness ($K_{IC}$) is found to be 9 MPa·$m^{1/2}$ or more, which is difficult to obtain from general ceramics as shown in Table 2.

MODE FOR INVENTION

Figure 6:
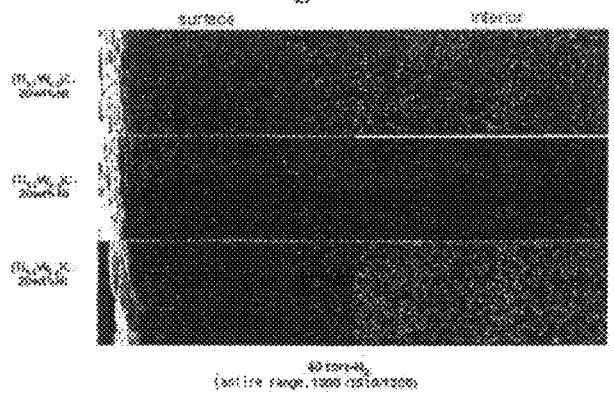
FIG. 6 is photographs illustrating the microstructures of surfaces and interiors of the sintered bodies obtained after some compositions [(Ti,W)C-20 wt % Ni; amount of WC is 30 mole %, 40 mole %, 50 mole %] according to the present invention are sintered in a nitrogen atmosphere at a pressure of 40 torr.
Figure 7:
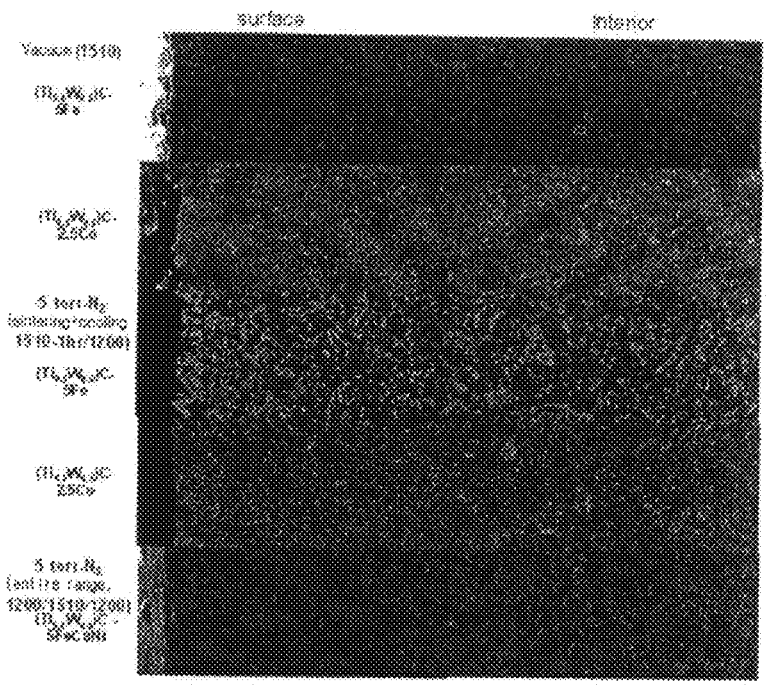
FIG. 7 is photographs illustrating the microstructures of $(Ti_{1-x}W_x)C$-Me cermets containing various binders (Co, Fe, FeCoNi) according to the present invention.
Figure 8:
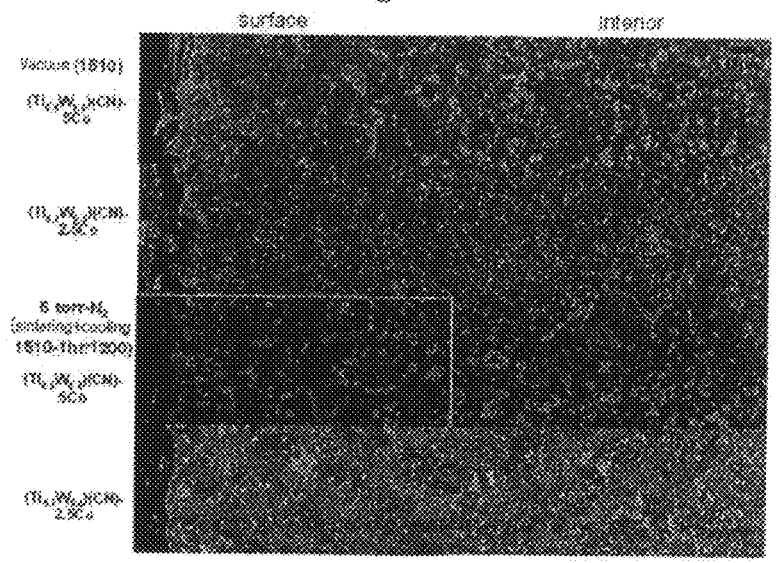
FIG. 8 is photographs illustrating the microstructures of $(Ti_{1-x}W_x)(CN)$—Co cermets in various atmospheres according to the present invention.

FIGS. 6 to 8 are photographs illustrating the microstructures of the sintered cermet samples according to an embodiment of the present invention.

FIG. 6 illustrates the microstructures of surfaces and interiors of the sintered bodies obtained by sintering some compositions [(Ti,W)C-20 wt % Ni; amount of WC is 30 mole %, 40 mole %, 50 mole %] of said (v) in a nitrogen atmosphere at a pressure of 40 torr. As such, the sintering was conducted while nitrogen was injected in the entire temperature range from the heating temperature [1473 K (1200° C.)], through the sintering temperature [1783 K (1510° C.), 1 hour], to the cooling temperature [1473 K (1200° C.)].

FIG. 7 illustrates the sintered ($Ti_{1-x}$,$W_x$)C-Me type cermet powders containing 2.5~5.0 wt % of various binders (Co, Fe, FeCoNi). For ($Ti_{0.5}$,$W_{0.5}$)C-5Fe and ($Ti_{0.5}$,$W_{0.5}$)C-2.5Co, vacuum sintering was conducted, or during the sintering and cooling, nitrogen of 5 torr was injected, and for ($Ti_{0.6}$,$W_{0.4}$)C-5FeCoNi, nitrogen was injected in the entire temperature range.

FIG. 8 illustrates the sintered ($Ti_{1-x}$,$W_x$)(CN)—Co type cermet powders containing 2.5~5.0 wt % of binder (Co). For ($Ti_{0.5}$,$W_{0.5}$)(CN)-5Co and ($Ti_{0.5}$,$W_{0.5}$)(CN)-2.5Co, vacuum sintering was conducted, or nitrogen of 5 torr was injected during the sintering and cooling.

As is illustrated in FIGS. 6 to 8, even when the (Ti,W)C-Me and (Ti,W)(CN)-Me cermet powders were used, the second phase was formed from the complete solid-solution phase.

As is apparent from the above drawings, in the case where the sintering was conducted using the ($Ti_{1-x}$,$W_x$)C-Me cermet powder while nitrogen of 40 torr was introduced, the sintered body having the microstructure in which the slightly circular WC and the solid-solution phase were uniformly distributed and densified was prepared. Further, as the amount of W in (Ti,W)C was increased, the size of the second phase was observed to be greater.

Furthermore, as is apparent from the above drawings, the shape and amount of the second phase can be seen to vary depending on the type of binder, whether the atmosphere is present or not, and the nitrogen-injecting period. As the amount of the CO binder was greater, the circular second phase was formed. Moreover, in the same nitrogen atmosphere, the whisker second phase was more easily deposited from the ($Ti_{0.5}$,$W_{0.5}$)(CN)-2.5Co cermet of FIG. 3c than from the ($Ti_{0.5}$,$W_{0.5}$)C-2.5Co cermet of FIG. 3b.

As shown in Table 1, in the case of the cermet having the second phase, hardness, in particular, toughness was observed to be improved.

INDUSTRIAL APPLICABILITY

The present invention may be applied to tool materials, such as cermets. Further, the present invention may be applied to ceramics having various structures requiring high hardness and high toughness.

The invention claimed is:

1. A ceramic, comprising:
a sintered body of solid-solution powder, including a composite solid-solution carbide powder, a composite solid-solution carbonitride powder or a mixture powder thereof, of two or more metals selected from Group IVa, Va, and VIa metals in the periodic table,
wherein said two or more metals comprise titanium and a Group VIa metal;
wherein a complete solid-solution phase and a second phase are present in a microstructure of the sintered body;
wherein said second phase is formed by a phase-separation treatment from the solid-solution phase and said second phase has an aspect ratio of at least 1:10; and
wherein the sintered body imparts the ceramic with an increased toughness compared to a ceramic of a same composition which is not subject to said phase separation treatment.

2. The ceramic according to claim 1, wherein an amount of the carbide, carbonitride or mixture thereof, of a Group VIa metal is 30~50 mole % based on a total amount of the composite carbide, composite carbonitride or mixture thereof of all metal elements of the solid-solution.

3. The ceramic according to claim 1, wherein the Group VIa metal is W or Mo.

4. The ceramic according to claim 1, wherein, in a case where a metal, other than the titanium and Group VIa metal, is selected, an amount of the carbide, carbonitride or mixture thereof of the metal is 0.1~20 mole % based on a total amount of the composite carbide, composite carbonitride or mixture thereof of all metal elements of the solid-solution.

5. The ceramic according to claim 1, wherein the microstructure of the sintered body further comprises a partial solid-solution phase, wherein the partial solid-solution phase is coexists with the complete solid-solution phase; and
wherein the second phase is formed by said phase-separation treatment from the complete solid-solution phase.

6. A cermet, comprising:
a sintered body, including a composite solid-solution carbide, a composite solid-solution carbonitride or a mixture thereof, of two or more metals selected from Group IVa, Va, and VIa metals in the periodic table; and at least one metal selected from the group consisting of nickel, cobalt, and iron,
wherein said two or more metals comprise titanium and a Group VIa metal; and
wherein a complete solid-solution phase and a second phase are present in a microstructure of the sintered body;
wherein said second phase is formed by a phase-separation from the solid-solution phase and said second phase is has an aspect ratio of at least 1:10; and
wherein the sintered body imparts the cermet with an increased toughness compared to a cermet of a same composition which is not subject to said phase separation treatment.

7. The cermet according to claim 6, wherein an amount of the carbide, carbonitride or mixture thereof of a Group VIa metal is 30~50 mole % based on a total amount of the composite carbide, composite carbonitride or mixture thereof.

8. The cermet according to claim 6, wherein the Group VIa metal is W or Mo.

9. The cermet according to claim 6, wherein, in a case where a metal, other than the titanium and Group VIa metal, is selected, an amount of the carbide, carbonitride or mixture thereof of the metal is 0.1~20 mole % based on a total amount of the composite carbide, composite carbonitride or mixture thereof.

10. The cermet according to claim 6, wherein the microstructure of the sintered body further comprises a partial solid-solution phase, wherein the partial solid-solution phase is coexists with the complete solid-solution phase; and
wherein the second phase is formed by said phase-separation treatment from the complete solid-solution phase.

11. A method of preparing a ceramic, comprising:
providing a complete solid-solution phase powder including a composite solid-solution carbide, a composite solid-solution carbonitride or a mixture thereof, of two or more metals selected from Group IVa, Va, and VIa metals in the periodic table, wherein said two or more metals comprise titanium and a Group VIa metal; and
sintering the provided powder to cause a phase separation to form a second phase,
wherein the ceramic has a microstructure comprising a complete solid-solution phase and a second phase; and
wherein an amount of the carbide, carbonitride or mixture thereof of a Group VIa metal is 30~50 mol % based on a total amount of the composite carbide, composite carbonitride or mixture thereof.

12. The method according to claim 11, wherein the providing the complete solid-solution phase powder comprises:
mixing or mixing and grinding at least two metal oxides and carbon powder; and
subjecting the powder to reducing and carburizing or to reducing, carburizing, and nitriding.

13. The method according to claim 11, wherein the Group VIa metal is W or Mo.

14. The method according to claim 11, wherein, in a case where a metal, other than the titanium and Group VIa metal, is selected, an amount of the carbide, carbonitride or mixture thereof of the metal is 0.1~20 mole % based on a total amount of the composite carbide, composite carbonitride or mixture thereof.

15. The method according to claim 11, further comprising mixing the powder with a hard phase TiC or Ti(CN) powder before the sintering.

16. The method according to claim 11, wherein the sintering the powder is conducted in a nitrogen or nitrogen-containing mixture gas atmosphere.

17. The method according to claim 16, wherein the sintering is conducted through heating in a furnace in a nitrogen or nitrogen-containing mixture gas atmosphere at a pressure of 0.1~100 torr.

18. The method according to claim 17, wherein the sintering is conducted through heating at a heating rate of 1~30 K per min and then sintering at 1600~1900 K.

19. The method according to claim 11, wherein hot pressing, hot isostatic pressing, or gas pressure sintering is applied upon the sintering or after the sintering.

20. The method according to claim 11, wherein a shape and a size of the second phase are changed by adjusting types of binder, an amount of the binder, an amount of the carbide, carbonitride or mixture thereof of the Group VIa metal, an injected nitrogen amount, a nitrogen-injecting time, a sintering time, a heating rate, or a sintering temperature.

21. A method of preparing a cermet, comprising:
mixing or mixing and grinding at least one metal selected from the group consisting of nickel, cobalt, and iron, at least two metal oxides selected, including titanium and a Group VIa metal, from Group IVa, Va, and VIa metals in the periodic table, and a carbon powder at a predetermined composition ratio, thus providing a nano-sized crystallite powder;
subjecting the powder to reducing and carburizing or to reducing, carburizing, and nitriding to give a carbide, carbonitride or a mixture thereof, of the at least one metal and at least two metal oxides; and
sintering the prepared powder to cause a phase separation to form a second phase,
wherein the cermet has a microstructure comprising a complete solid-solution phase and a second phase; and
wherein an amount of the carbide, carbonitride or mixture thereof of the selected Group VIa metal is 30-50 mol % based on a total amount of the composite carbide, composite carbonitride or mixture thereof.

22. The method according to claim 21, wherein the Group VIa metal is W or Mo.

23. The method according to claim 21, wherein, in a case where a metal, other than the titanium and Group VIa metal, is selected, an amount of the carbide, carbonitride or mixture thereof of the metal is 0.1~20 mole % based on a total amount of composite carbide, composite carbonitride or mixture thereof.

24. The method according to claim 21, further comprising mixing the powder with a hard phase TiC or Ti(CN) powder before the sintering.

25. The method according to claim 21, wherein the sintering the powder is conducted in a nitrogen or nitrogen-containing mixture gas atmosphere.

26. The method according to claim 25, wherein the sintering is conducted through heating in a furnace in a nitrogen or nitrogen-containing mixture gas atmosphere at a pressure of 0.1~100 torr.

27. The method according to claim 26, wherein the sintering is conducted through heating at a heating rate of 1~30 K per min and then sintering at 1600~1900 K.

28. The method according to claim 21, wherein hot pressing, hot isostatic pressing, or gas pressure sintering is applied at a time of the sintering or after the sintering.

29. The method according to claim 21, wherein a shape and a size of the second phase are changed by adjusting types of binder, an amount of the binder, an amount of the carbide, carbonitride or mixture thereof of the selected Group VIa metal, an injected nitrogen amount, a nitrogen-injecting time, a sintering time, a heating rate, or a sintering temperature.

* * * * *